US010197870B2

(12) United States Patent
Liu

(10) Patent No.: US 10,197,870 B2
(45) Date of Patent: Feb. 5, 2019

(54) ARRAY SUBSTRATE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Sha Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 37 days.

(21) Appl. No.: 15/513,732

(22) PCT Filed: Sep. 26, 2016

(86) PCT No.: PCT/CN2016/100147
§ 371 (c)(1),
(2) Date: Mar. 23, 2017

(87) PCT Pub. No.: WO2017/118112
PCT Pub. Date: Jul. 13, 2017

(65) Prior Publication Data
US 2018/0231850 A1 Aug. 16, 2018

(30) Foreign Application Priority Data
Jan. 4, 2016 (CN) .......................... 2016 1 0005327

(51) Int. Cl.
*H01L 27/12* (2006.01)
*G02F 1/1343* (2006.01)
(Continued)

(52) U.S. Cl.
CPC ...... *G02F 1/134363* (2013.01); *G02F 1/1343* (2013.01); *G02F 1/134336* (2013.01);
(Continued)

(58) Field of Classification Search
CPC . H01L 27/12; G02F 1/1343; G02F 1/134363; G02F 1/1368; G02F 1/134366;
(Continued)

(56) References Cited

U.S. PATENT DOCUMENTS 5,969,782 A 10/1999 Lee et al.
2014/0049740 A1* 2/2014 Xu .................... G02F 1/134363
349/141
(Continued)

FOREIGN PATENT DOCUMENTS

CN 202583658 U 12/2012
CN 102854671 A 1/2013
(Continued)

OTHER PUBLICATIONS

The First Chinese Office Action dated Feb. 9, 2018; Appln. No. 201610005327.7.
(Continued)

*Primary Examiner* — Chuong A Luu
(74) *Attorney, Agent, or Firm* — Ladas & Parry LLP; Loren K. Thompson

(57) ABSTRACT

An array substrate and a display device. The array substrate includes an insulating layer, and a first electrode layer and a second electrode layer respectively arranged on two sides of the insulating layer, with a first electrode group being formed by the first electrode layer and the second electrode layer. The first electrode group includes: a first strip pixel electrode and a second strip pixel electrode, where the first pixel electrode and the second pixel electrode are insulated from each other, disposed in the first electrode layer, and applied with different voltages in an operation process; and a first strip common electrode being disposed in the second electrode layer and including a member disposed between the first pixel electrode and the second pixel electrode in a
(Continued)

direction from the first pixel electrode to the second pixel electrode.

18 Claims, 6 Drawing Sheets

(51) Int. Cl.
*G02F 1/1362* (2006.01)
*G02F 1/1368* (2006.01)

(52) U.S. Cl.
CPC .. *G02F 1/136213* (2013.01); *G02F 1/136286* (2013.01); *G02F 1/1368* (2013.01); *G02F 2001/134318* (2013.01); *G02F 2201/121* (2013.01); *G02F 2201/122* (2013.01); *G02F 2201/123* (2013.01); *G02F 2201/124* (2013.01)

(58) Field of Classification Search
CPC ......... G02F 1/136213; G02F 1/136286; G02F 1/134318; G02F 1/121; G02F 1/122; G02F 1/123; G02F 1/124; G02F 1/1362
USPC .......................................................... 257/72
See application file for complete search history.

(56) References Cited

U.S. PATENT DOCUMENTS

2014/0132907 A1* 5/2014 Qin ................... G02F 1/134363
349/143
2016/0048061 A1 2/2016 Wang et al.
2016/0291417 A1 10/2016 Choi et al.

FOREIGN PATENT DOCUMENTS

| CN | 102981320 A | 3/2013 |
| CN | 103439840 A | 12/2013 |
| CN | 103969898 A | 8/2014 |
| CN | 104570530 A | 4/2015 |
| CN | 104932159 A | 9/2015 |
| CN | 105404062 A | 3/2016 |
| KR | 1020030045458 A | 6/2003 |

OTHER PUBLICATIONS

International Search Report and Written Opinion dated Dec. 26, 2016; PCT/CN2016/100147.

* cited by examiner

ARRAY SUBSTRATE AND DISPLAY DEVICE

TECHNICAL FIELD

Embodiments of the present disclosure relate to an array substrate and a display device.

BACKGROUND

Liquid crystal display (LCD) devices have been widely applied in various fields such as monitors, TVs and notebook computers. The LCD devices may include LCD devices of a vertical electric field type and LCD devices of a horizontal electric field type. In an LCD device of the vertical electric field type, pixel electrodes and common electrodes are respectively disposed on an array substrate and an opposing substrate of the LCD device; and in an LCD device of the horizontal electric field type, both pixel electrodes and common electrodes are disposed on an array substrate of the LCD device.

The fringe field switching (FFS) technology is a technology commonly used in an LCD device of the horizontal electric field type. An LCD device adopting this technology (namely an FFS mode LCD device) comprises common electrodes and pixel electrodes, with the common electrodes and pixel electrodes being disposed in different layers of an array substrate respectively. Deflection of liquid crystal molecules in the LCD is controlled by fringe fields formed between the common electrodes and the pixel electrodes.

SUMMARY

At least an embodiment of the present disclosure provides an array substrate and a display device to improve transmission of the display device.

At least an embodiment of the disclosure provides an array substrate, which includes a base substrate, an insulating layer disposed on the base substrate, and a first electrode layer and a second electrode layer disposed on the base substrate and respectively arranged on two sides of the insulating layer. A first electrode group is formed by the first electrode layer and the second electrode layer. The first electrode group includes a first strip pixel electrode, a second strip pixel electrode, and a first strip common electrode. The first pixel electrode and the second pixel electrode are insulated from each other, disposed in the first electrode layer, and applied with different voltages in an operation process; and the first strip common electrode is disposed in the second electrode layer and includes a member disposed between the first pixel electrode and the second pixel electrode in a direction from the first pixel electrode to the second pixel electrode.

At least an embodiment of the disclosure provides a display device, which includes the above array substrate.

BRIEF DESCRIPTION OF THE DRAWINGS

In order to illustrate the technical solutions in the embodiments of the present disclosure more clearly, the drawings used in the description of the embodiments will be briefly described in the following; it is obvious that the drawings described below are only related to some embodiments of the present disclosure and are not intended to limit the scope of the disclosure.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Unless otherwise clearly defined, technological terms or scientific terms used in the disclosure have common meanings understood by persons of ordinary skills in a field that the disclosure belongs to. In the present disclosure, terms such as "first", "second" and the like used in the present disclosure do not indicate any sequence, quantity or significance but only for distinguishing different constituent parts. The terms "comprises," "comprising," "includes," "including," etc., are intended to specify that the elements or the objects stated before these terms encompass the elements or the objects and equivalents thereof listed after these terms, but do not preclude the other elements or objects. Terms such as "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Terms such as "up," "down,"

"left," "right" and so on, are used to indicate relative positional relationships. When an absolute position of a described object changes, a relative positional relationship of the object also changes possibly.

Figure 1A:
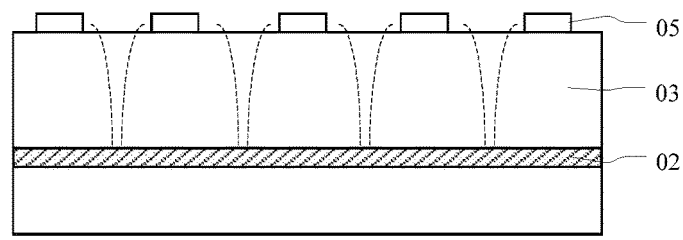
FIG. 1A is a schematic sectional view of an array substrate of an FFS mode LCD device.
Figure 1B:
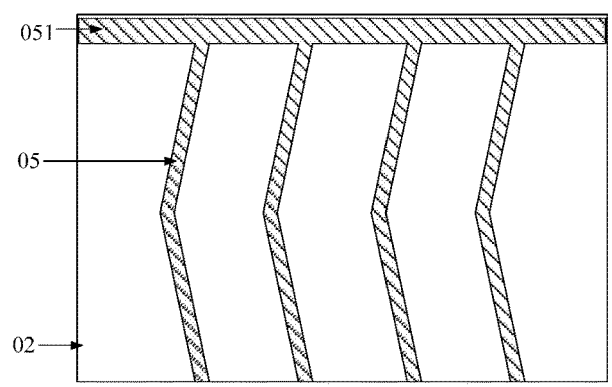
FIG. 1B is a schematic top view of FIG. 1A.

FIG. 1A is a schematic sectional view of an array substrate of an FFS mode LCD device, and FIG. 1B is a schematic top view of FIG. 1A. As illustrated in FIGS. 1A and 1B, the array substrate of the FFS mode LCD device comprises a plate electrode 02 and a plurality of strip electrodes 05, with the plate electrode 02 and the strip electrodes 05 being disposed on two sides of an insulating layer 03 respectively. End portions of the strip electrodes 05 are electrically connected with each other through a connecting electrode 051. One of the plate electrode 02 and the strip electrodes 05 is a common electrode, and the other of the plate electrode 02 and the strip electrodes 05 is a pixel electrode. In an operation process of the FFS mode LCD device, a common voltage is applied to the common electrode, a pixel voltage is applied to the pixel electrode. As there is a voltage difference between the common voltage and the pixel voltage, a fringe field (FFS field as shown by dotted lines in FIG. 1A) may be formed between the common electrode and the pixel electrode. The fringe field may be configured to control the deflection of liquid crystals.

The inventor of the disclosure has noticed in research that one of the development trends of the FFS mode LCD device is in pursuit of high transmittance and low product power consumption. Most current methods for improving the transmittance of FFS mode LCD products adopt materials with high transmittance.

Embodiments of the present disclosure provide an array substrate and a display device comprising the array substrate. The array substrate comprises first strip common electrodes, and first strip pixel electrodes and second strip pixel electrodes which are applied with different voltages in the operation process. A layer provided with the first pixel electrodes and the second pixel electrodes is different from a layer provided with the first common electrodes.

In an aspect, in the operation process of the array substrate provided by the embodiments of the present disclosure, horizontal electric fields between the first pixel electrodes and the second pixel electrodes, namely in-plane switching (IPS) electric fields, and FFS electric fields between the first common electrodes and each of the first pixel electrodes and the second pixel electrodes, may be simultaneously formed. Compared with the case in the array substrate as shown in FIGS. 1A and 1B in which only FFS electric fields between pixel electrodes and common electrodes are formed, the deflection of liquid crystals can be effectively controlled in the display device comprising the array substrate provided by the embodiments of the present disclosure, so that the transmittance can be improved.

In another aspect, compared with the case as shown in FIGS. 1A and 1B, a planar shape of each of the first pixel electrodes, the second pixel electrodes and the first common electrodes in the embodiments of the present disclosure is a strip shape. Thus, overlapping portions between the first common electrodes and each of the first pixel electrodes and the second pixel electrodes in a direction perpendicular to a plate surface of the array substrate can be reduced, so that a storage capacitance can be reduced, and hence the power consumption of the array substrate can be reduced.

Detailed description will be given below to the array substrate and the display device provided by the embodiments of the present disclosure, with reference to the accompanying drawings.

First Embodiment

Figure 2A:
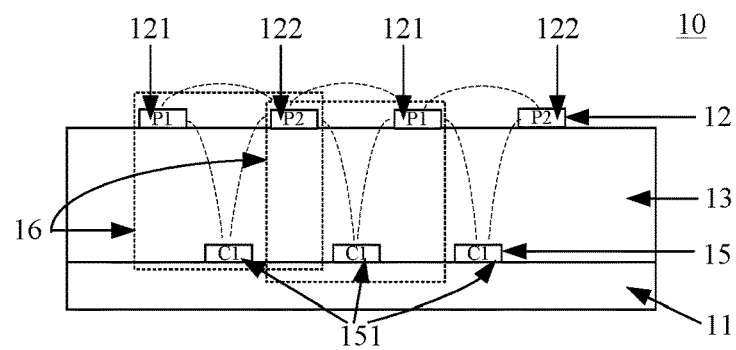
FIG. 2A is a schematic sectional view of an array substrate provided by an embodiment of the present disclosure.

As illustrated in FIG. 2A, the embodiment provides an array substrate 10, which comprises a base substrate 11, an insulating layer 13 disposed on the base substrate 11, and a first electrode layer 12 and a second electrode layer 15 which are disposed on the base substrate 11 and respectively arranged on two sides of the insulating layer 13. First electrode groups 16 are formed by the first electrode layer 12 and the second electrode layer 15. A first electrode group 16 includes a first strip pixel electrode 121, a second strip pixel electrode 122 and a first strip common electrode 151. The first pixel electrodes 121 and the second pixel electrodes 122 are insulated from each other, disposed in the first electrode layer 12, and applied with different voltages during the operation process, so that voltage difference can be formed between the first pixel electrodes 121 and the second pixel electrodes 122. The first common electrodes 151 are disposed in the second electrode layer 15 and include members disposed between the first pixel electrodes 121 and the second pixel electrodes 122 along the directions from the first pixel electrodes 121 to the second pixel electrodes 122.

In the operation process of the array substrate provided by the embodiment, different pixel voltages are applied to the first pixel electrodes 121 and the second pixel electrodes 122. As shown in FIG. 2A, a first pixel voltage P1 is applied to the first pixel electrodes 121 and a second pixel voltage P2 is applied to the second pixel electrodes 122, so that voltage difference can be formed between the first pixel electrodes 121 and the second pixel electrodes 122. Therefore, IPS electric fields may be formed between the first pixel electrodes 121 and the second pixel electrodes 122 (as shown by dotted lines which are between the first pixel electrodes 121 and the second pixel electrodes 122 in FIG. 2A and substantially extend along the horizontal direction). A constant first common voltage C1 is applied to the first common electrodes 151. Moreover, the first common voltage C1 is different from the pixel voltages P1 and P2 applied to the first pixel electrodes 121 and the second pixel electrodes 122 respectively, so that voltage difference can be formed between the first common electrodes 151 and each of the first pixel electrodes 121 and the second pixel electrodes 122. Therefore, FFS electric fields can be formed (as shown by dotted lines which substantially extend in the vertical direction between the first common electrodes 151 and the first/second pixel electrodes 121/122 in FIG. 2A). In a display device comprising the array substrate provided by the embodiment of the present disclosure, liquid crystals can be effectively deflected under the combined action of the IPS electric fields and the FFS electric fields, so that the transmittance can be improved.

For instance, as shown in FIG. 2A, in the array substrate 10 provided by at least one example of the embodiment, the first common electrode 151 may not be overlapped with each of the first pixel electrode 121 and the second pixel electrode 122 in a direction perpendicular to the plate surface of the base substrate 11.

Figure 2B:
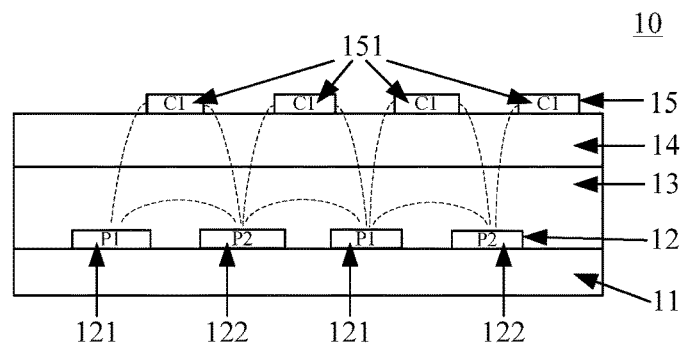
FIG. 2B is a schematic sectional view of an array substrate provided by an embodiment of the present disclosure.

For instance, as shown in FIG. 2B, in the array substrate 10 provided by at least one example of the embodiment, the first common electrodes 151 may be partially overlapped with at least one of the first pixel electrode 121 or the second pixel electrode 122 in the direction perpendicular to the plate surface of the base substrate 11. Description is given in FIG. 2B by taking the case that the first common electrode 151 is partially and vertically overlapped with both the first pixel electrode 121 and the second pixel electrode 122 as an example.

Compared with the approach as shown in FIG. 2B, there is no storage capacitance between the first common electrodes 151 and each of the first pixel electrodes 121 and the second pixel electrodes 122 in the approach as shown in FIG. 2A, so that the power consumption can be reduced.

Description is given in FIG. 2A by taking the case that the first common electrodes 151 are disposed on one side of the insulating layer 13 close to the base substrate 11 (namely a lower layer in FIG. 2A) and the first pixel electrodes 121 and the second pixel electrodes 122 are disposed on another side of the insulating layer 13 away from the base substrate 11 (namely an upper layer in FIG. 2A) as an example. Description is given in FIG. 2B by taking the case that the first common electrodes 151 are disposed on one side of the insulating layer away from the base substrate 11 and the first pixel electrodes 121 and the second pixel electrodes 122 are disposed between the insulating layer 13 and the base substrate 11 as an example.

In the case as shown in FIG. 2B, one part of an IPS electric field formed between the first pixel electrode 121 and the second pixel electrode 122 disposed on the lower layer is shielded by the first common electrode 151 disposed on the upper layer. In the case as shown in FIG. 2A, as the first pixel electrode 121 and the second pixel electrode 122 are arranged on the upper layer, the IPS electric fields between the first pixel electrode 121 and the second pixel electrode 122 may not be shielded by the first common electrode 151 disposed on the lower layer. Therefore, compared with the case as shown in FIG. 2B, the case as shown in FIG. 2A has a stronger electric field, so that the transmittance can be improved.

In FIG. 2A, one insulating layer 13 is disposed between the first electrode layer 12 and the second electrode layer 15. Of course, a plurality of insulating layers may also be disposed between the first electrode layer 12 and the second electrode layer 15. For instance, as shown in FIG. 2B, a passivation layer 14 may also be formed. When more insulating layers are disposed between the first electrode layer 12 and the second electrode layer 15, a distance between the two electrode layers is farther, so that the storage capacitance can be reduced.

For instance, in the array substrate 10, directions and/or magnitude values of the voltages P1 and P2 applied to the first pixel electrodes 121 and the second pixel electrodes 122 may be different. For instance, one of the first pixel voltage P1 and the second pixel voltage P2 may be a positive voltage and the other of the first pixel voltage P1 and the second pixel voltage P2 may be a negative voltage; or both the first pixel voltage P1 and the second pixel voltage P2 may be positive voltages with different magnitude values, or are negative voltages with different magnitude values.

For consistent intensity and uniform distribution of FFS electric fields formed between the first pixel electrodes 121 and the first common electrodes 151 and FFS electric fields formed between the second pixel electrodes 122 and the first common electrodes 151, for instance, an absolute value of the difference of the voltages applied to the first pixel electrodes 121 and the first common electrodes 151 (namely the difference between P1 and C1) may be equal to an absolute value of the difference of the voltages applied to the second pixel electrodes 122 and the first common electrodes 151 (namely the difference between P2 and C1). For instance, a +5V voltage may be applied to the first pixel electrodes 121; a −5V voltage may be applied to the second pixel electrodes 122; and a 0V voltage may be applied to the first common electrodes 151. Of course, the settings of P1, P2 and C1 in the embodiment of the present disclosure are not limited thereto.

For instance, in the direction from a first pixel electrode 121 to an adjacent second pixel electrode 122, a distance between the first pixel electrode 121 and a first common electrode 151 between the first pixel electrode 121 and the second pixel electrode 122 may be equal to a distance between the second pixel electrode 122 and the first common electrode 151. Thus, high transmittance can be obtained, and uniformly distributed FFS electric fields can be formed. Of course, the embodiment of the present disclosure includes but not limited thereto.

For instance, the first pixel electrodes 121, the second pixel electrodes 122 and the first common electrodes 151 may all be made from transparent conductive materials, so as to avoid impact on the aperture opening ratio and improve the transmittance. In addition, widths of the first pixel electrodes, the second pixel electrodes and the first common electrodes may be adjusted within a certain range according to manufacture capability, and the transmittance can be improved as much as possible by the design of different sizes.

Figure 2C:
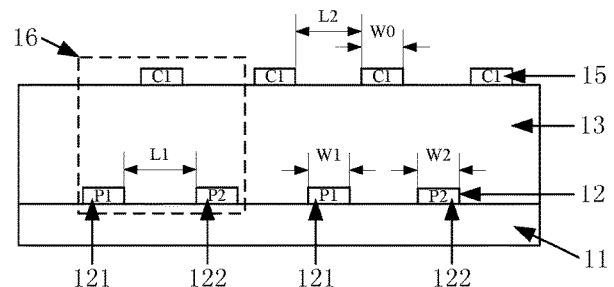
FIG. 2C is a schematic sectional view of an array substrate provided by an embodiment of the present disclosure.

For instance, in the array substrate 10 provided by at least one example of the embodiment as shown in FIG. 2C, in the direction from the first pixel electrodes 121 to the second pixel electrodes 122, a ratio of a distance L1 between a first pixel electrode 121 and an adjacent second pixel electrode 122 to a width W1 of the first pixel electrodes 121 and a ratio of the distance L1 and a width W2 of the second pixel electrode 122 may all be 1.6-5, preferably 1.6-3; and/or a plurality of first electrode groups 16 are formed by the first electrode layer 12 and the second electrode layer 15, and in the direction from the first pixel electrodes 121 to the second pixel electrodes 122, a ratio of a distance L2 between first common electrodes 151 of two adjacent first electrode groups 16 to a width W0 of the first common electrodes 151 may be 1.6-5, preferably 1.6-3. High transmittance can be obtained within the range.

For instance, in the array substrate 10 provided by at least one example of the embodiment, the widths W1, W2 and W0 of the first pixel electrodes 121, the second pixel electrodes 122 and the first common electrodes 151 may all be 2-10 μm, preferably 2-8 μm. High transmittance can be obtained within the range.

In the case as shown in FIGS. 1A and 1B, as overlapping portions between the strip electrodes 05 and the plate electrode 02 are large, the storage capacitance between the strip electrodes 05 and the plate electrode 02 is large. Therefore, a width of the connecting electrode 051, which electrically connects the strip electrodes 05 together at the periphery of the strip electrodes 05, should be set to be as small as possible, so as to reduce the storage capacitance between the connecting electrode 051 and the plate electrode 02.

In the array substrate provided by the embodiment, as the first/second pixel electrodes and the first common electrodes have small overlapping portions and even are not overlapped, the power consumption of the array substrate can be greatly reduced and the size of switching elements (e.g., thin-film transistors (TFTs)) on the array substrate can be reduced compared with the case as shown in FIGS. 1A and 1B. Thus, a large storage capacitance can be set at the periphery of a pixel unit on the premise of ensuring the aperture opening ratio of the pixel unit. Detailed description will be given below to the setting approach of the storage capacitance in the array substrate provided by the embodiment.

Figure 3A:
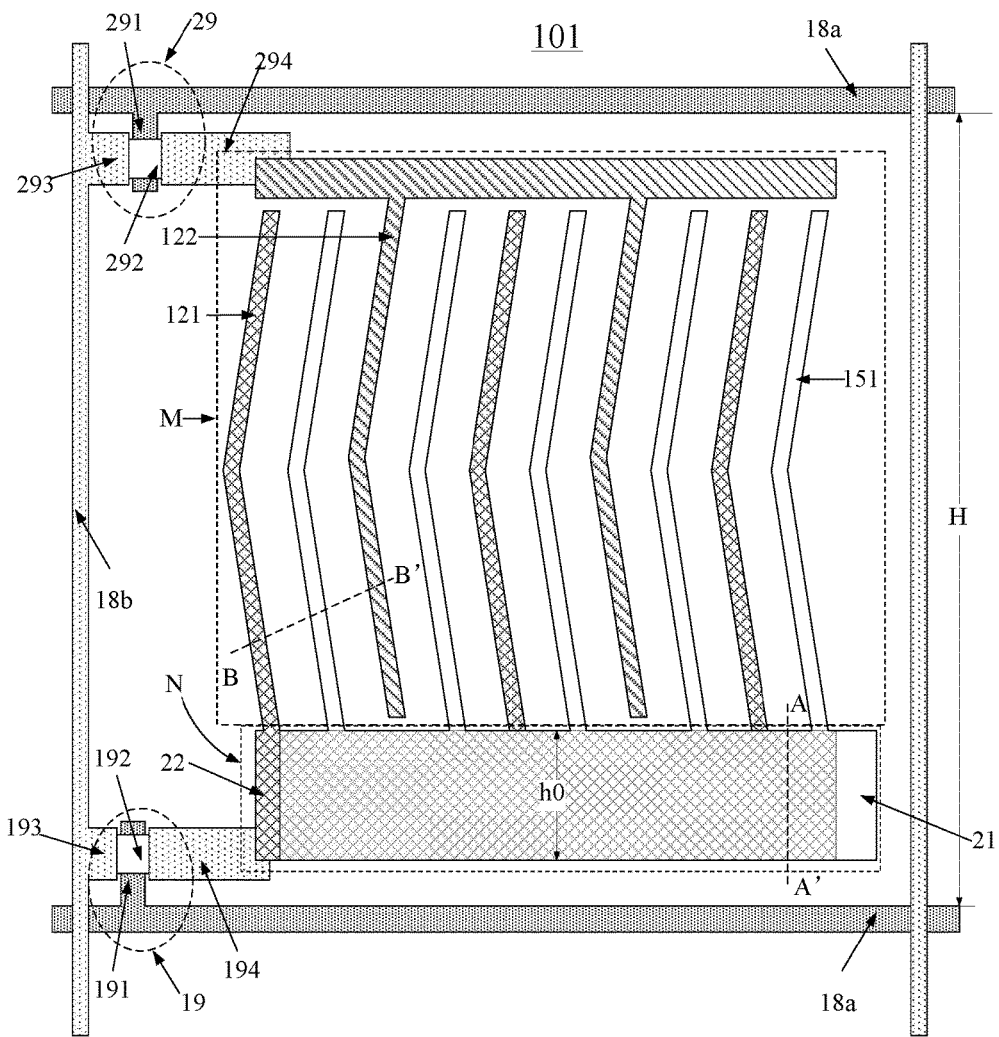
FIG. 3A is a schematic top view of a pixel unit in an embodiment of the present disclosure.
Figure 3B:
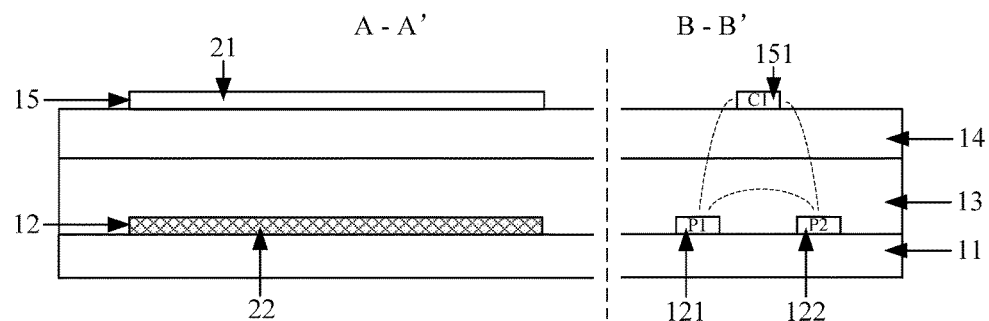
FIG. 3B includes sectional views along A-A' and B-B' lines in FIG. 3A.

For instance, as shown in FIGS. 3A and 3B, with FIG. 3B including sectional views along A-A' and B-B' lines in FIG. 3A, the array substrate 10 provided by at least one example of the embodiment further comprises a plurality of pixel units 101 (only one pixel unit is shown in FIG. 3A); each pixel unit 101 includes a central region (as shown by an area M in FIG. 3A) and a peripheral region (as shown by an area N in FIG. 3A) disposed at the periphery of the central region M; the central region M is provided with first electrode groups described above (not shown in the figure); and the peripheral region N is provided with a plate common electrode 21 and a plate pixel electrode 22 which are respectively disposed on two sides of the insulating layer 13 (as shown in FIG. 3B) and are overlapped in the direction perpendicular to the plate surface of the base substrate 11 (as shown in FIG. 3B), so that a storage capacitance can be formed by the overlapping portions of the plate common electrode 21 and the plate pixel electrode 22.

For instance, the plate common electrode 21 may be disposed in one of the first electrode layer 12 and the second electrode layer 15, and the plate pixel electrode 22 may be disposed in the other of the first electrode layer 12 and the second electrode layer 15.

Description is given in FIG. 3B by taking the case that the plate common electrode 21 is disposed in the second electrode layer 15 and the plate pixel electrode 22 is disposed in the first electrode layer 12 as an example. In this case, in order to simplify the structure, as shown in FIG. 3A, the first strip common electrodes 151 and the plate common electrode 21 may be integrally formed, and the first strip pixel electrodes 121 or the second strip pixel electrodes 122 may be integrally formed together with the plate pixel electrode 22 (description is given in FIG. 3A by taking the case that the first pixel electrodes 121 and the plate pixel electrode 22 are integrally formed as an example). The embodiment of the present disclosure includes but not limited thereto.

Figure 4A:
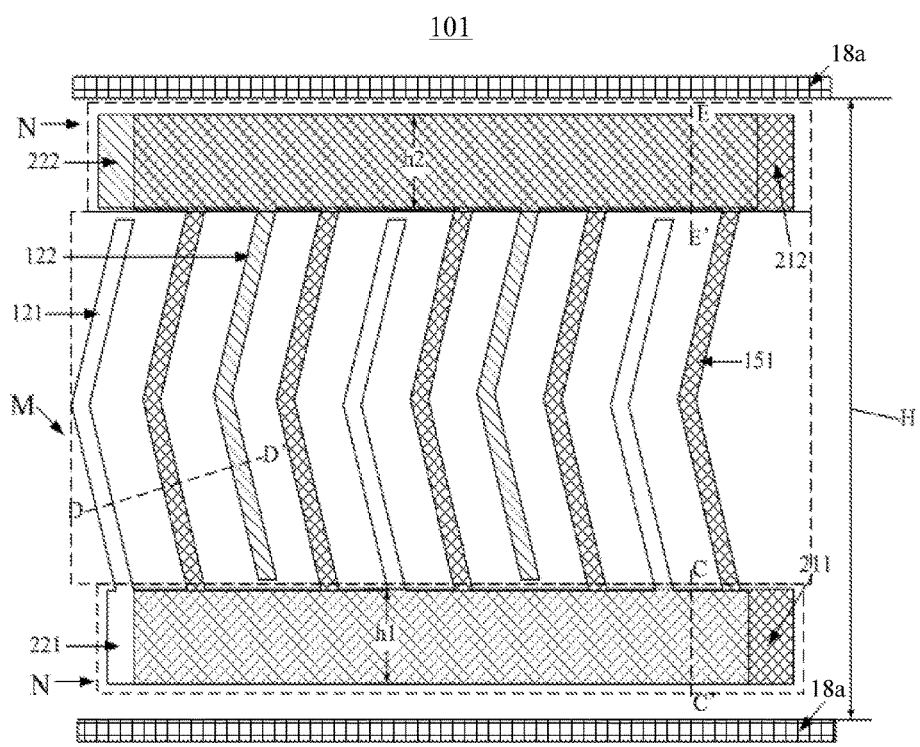
FIG. 4A is a schematic top view of a pixel unit in an embodiment of the present disclosure.
Figure 4B:
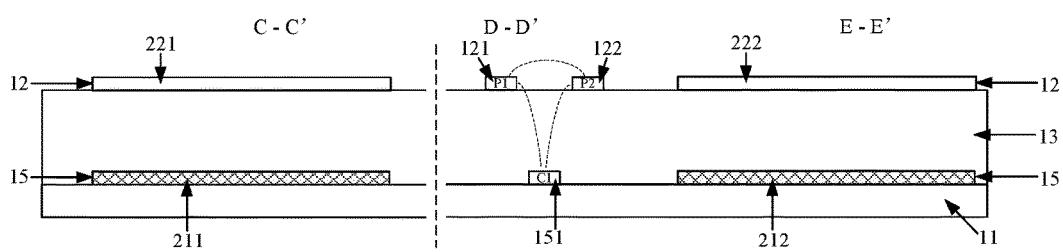
FIG. 4B includes sectional views along C-C', D-D' and E-E' lines in FIG. 4A.

For instance, as shown in FIGS. 4A and 4B, where FIG. 4B includes sectional views along C-C', D-D' and E-E' lines in FIG. 4A, the array substrate 10 provided by at least one example of the embodiment comprises a plurality of pixel units (only one pixel unit is shown in FIG. 4A); and each pixel unit 101 includes a central region (as shown by an area M in FIG. 4A) and a peripheral region (as shown by an area N in FIG. 4A) disposed at the periphery of the central region M. The central region M is provided with the first electrode groups described above (not shown in the figure). The peripheral region N is provided with a first plate common electrode 211 and a first plate pixel electrode 221 (so as to form a first storage capacitance by overlapping portions of the two) which are respectively disposed on two sides of the insulating layer 13 (as shown in FIG. 4B) and are overlapped in the direction perpendicular to the plate surface of the base substrate 11 (as shown in FIG. 4B). The peripheral region N is also provided with a second plate common electrode 212 and a second plate pixel electrode 222 (so as to form a second storage capacitance by overlapping portions of the two) which are respectively disposed on two sides of the insulating layer 13 and are overlapped in the direction perpendicular to the plate surface of the base substrate 11. In the direction from the first plate common electrode 211 to the second plate common electrode 212, the first strip common electrodes 151 are disposed between the first plate common electrode 211 and the second plate common electrode 212.

For instance, the first plate common electrode 211 and the second plate common electrode 212 may be disposed in one of the first electrode layer 12 and the second electrode layer 15, and the first plate pixel electrode 221 and the second plate pixel electrode 222 may be disposed in the other of the first electrode layer 12 and the second electrode layer 15.

Description is given in FIG. 4B by taking the following case as an example, where the first plate common electrode 211 and the second plate common electrode 212 are disposed in the second electrode layer 15, and the first plate pixel electrode 221 and the second plate pixel electrode 222 are disposed in the first electrode layer 12. In this case, in order to simplify the structure, as shown in FIG. 4A, the first strip common electrodes 151 and the first and second plate common electrodes 211, 212 may be integrally formed. The first strip pixel electrodes 121 or the second strip pixel electrodes 122 may be integrally formed with at least one of the first plate pixel electrode 221 and the second plate pixel electrode 222 (description is given in FIG. 4A by taking the case that the first pixel electrodes 121 and the first plate pixel electrode 221 are integrally formed and the second pixel electrodes 122 and the second plate pixel electrode 222 are integrally formed as an example). The embodiment of the present disclosure includes but not limited thereto.

When the array substrate as shown in FIGS. 3A and 4A is applied in a display device, the peripheral regions of the pixel units in the array substrate usually correspond to a black matrix (BM) in the display device. That is to say, the central region of the pixel unit is an opening region and the peripheral region is a nontransparent region (namely a non-display region), so that the plate electrodes can be shielded by the black matrix and cannot affect the display effect.

As the black matrix in the display device generally include a first portion extending along a gate-line direction of the array substrate and a second portion extending along a data-line direction of the array substrate, and the switching elements (e.g., the TFTs) for controlling the pixel units of the array substrate are usually disposed at positions close to gate lines and mainly shielded by the first portion of the black matrix extending along the gate-line direction, the width of the first portion of the black matrix is generally greater than the width of the second portion of the black matrix. In this case, in order to avoid the impact on the aperture opening ratio of the array substrate as much as possible, the peripheral regions of the pixel units may be arranged close to the gate lines.

Description is given in FIG. 3A and FIG. 4A by taking the case that the first pixel electrodes 121, the second pixel electrodes 122 and the first common electrodes 151 are V-shaped as an example. But the planar shape of the first pixel electrodes 121, the second pixel electrodes 122 and the first common electrodes 151 is not limited thereto, and other strip structures, e.g., a straight-line shape or cambered shape, may also be adopted.

In the embodiment of the present disclosure, the storage capacitance may be adjusted by adjusting the size of the plate electrodes described above.

For instance, in the array substrate 10 provided by at least one example of the embodiment, a percentage of an area of the plate common electrode 21 to an area of the pixel unit 101 and a percentage of an area of the plate pixel electrode 22 to the area of the pixel unit 101 may both be 10%-15%. Or, a percentage of the sum of the area of the first plate common electrode 211 and the area of the second plate common electrode 212 to the area of the pixel unit and a percentage of the sum of the area of the first plate pixel electrode 221 and the area of the second plate pixel electrode 222 to the area of the pixel unit may both be 10%-15%.

For instance, as shown in FIG. 3A, each pixel unit includes gate lines 18a that face each other oppositely and data lines 18b that face each other oppositely, and a region defined by the gate lines 18a and the data lines 18b is the pixel unit. In this case, the area of the pixel unit 101 is an area of a region defined by the gate lines 18a and the data lines 18b.

For instance, as shown in FIG. 3A, in the array substrate 10 provided by the embodiment, in the direction perpendicular to the extension direction of the gate lines 18a, the central region M and the peripheral region N are sequentially arranged, and a ratio of the size of the plate common electrode 21 to a distance H between the gate lines 18a and a ratio of the size of the plate pixel electrode 22 to the distance H between the gate lines 18a may both be 10%-15%. Description is given in FIG. 3A by taking the case that both the size of the plate common electrode 21 and the size of the plate pixel electrode 22 are h0 as an example. The embodiment of the present disclosure includes but not limited thereto.

Or, as shown in FIG. 4A, in the direction perpendicular to the extension direction of the gate lines 18a, the first electrode group (not shown in the figure) is disposed between the first plate common electrode 211 and the second plate common electrode 212, and a ratio of the sum of the size of the first plate common electrode 211 and the size of the second plate common electrode 212 (the sum of h1 and h2) to the distance H between the gate lines 18a and a ration of the sum of the size of the first plate pixel electrode 221 and the size of the second plate pixel electrode 222 (the sum of h1 and h2) to the distance H between the gate lines 18a are both 10%-15%. Description is given in FIG. 4A by taking the case that both the size of the first plate common electrode 211 and the size of the first plate pixel electrode 221 are h1 and both the size of the second plate common electrode 212 and the size of the second plate pixel electrode 222 are h2 as an example. The embodiment of the present disclosure includes but not limited thereto.

In the array substrate provided by the embodiment, different pixel voltages may be applied to the first pixel electrodes 121 and the second pixel electrodes 122 through, for instance, different components (for example, switching elements (e.g., TFTs)). For instance, as shown in FIG. 3A, the first pixel electrodes 121 are electrically connected with a first TFT 19, and the second pixel electrodes 122 are electrically connected with a second TFT 29. The first TFT 19 includes a gate electrode 191 (the gate electrode being, for instance, integrally formed with the gate line 18a), an active layer 192, a source electrode 193 (the source electrode being, for instance, integrally formed with the data line 18b) and a drain electrode 194. The second TFT 29 includes a gate electrode 291 (the gate electrode being, for instance, integrally formed with the other gate line 18a), an active layer 292, a source electrode 293 (the source electrode being, for instance, integrally formed with the data line 18b) and a drain electrode 294. The embodiment of the present disclosure includes but not limited thereto.

Description will be given below to a method for manufacturing an array substrate provided by the embodiment of the present disclosure, by taking the array substrate as shown in FIGS. 3A and 3B as an example. The method, for instance, may comprise the following steps.

Step S01: depositing a first transparent conductive film, e.g., an indium tin oxide (ITO) film, on a base substrate 11, and patterning the first transparent conductive film by, for instance, a photolithography process to form a first electrode layer 12 including first pixel electrodes 121, second pixel electrodes 122 and a plate pixel electrode 22.

Step S02: depositing a gate metal film on the base substrate 11, and patterning the gate metal film by, for instance, a photolithography process to form a gate metal layer including gate lines 18a and gate electrodes 191 and 291.

For instance, in this step, the gate metal layer may also include common electrode lines (not shown in the figure), and an extension direction of the common electrode lines is substantially the same as the extension direction of the gate lines 18a.

Step S03: forming an insulating layer 13 on the base substrate 11.

Step S04: depositing an active layer film on the base substrate 11, and patterning the active layer film by, for instance, a photolithography process to form active layers 192 and 292.

Step S05: depositing a source/drain metal film on the base substrate 11, and patterning the source/drain metal film by, for instance, a photolithography process to form a source/drain metal layer including data lines 18b, source electrodes 193 and 293, and drain electrodes 194 and 294.

In this step, the source electrodes and the drain electrodes are respectively connected with the active layers, so that the TFTs 19 and 29 including their respective gate electrodes, active layers, source electrodes and drain electrodes can be obtained.

In addition, for instance, each drain electrode may be electrically connected with the first pixel electrodes 121 or the second pixel electrodes 122 via a through hole (not shown in the figure) in the insulating layer 13. The first pixel electrode 121 and the second pixel electrode 122 in each first electrode group to be formed are electrically connected with drain electrodes of different TFTs, so that different pixel voltages can be applied to the first pixel electrode 121 and the second pixel electrode 122 through corresponding drain electrodes.

Step S06: forming a passivation layer 14 on the base substrate 11.

Step S07: depositing, for instance, a second transparent conductive film, e.g., an ITO film, on the base substrate 11, and patterning the second transparent conductive film by, for instance, a photolithography process to form a second electrode layer 15 including first common electrodes 151 and a plate common electrode 21.

In this step, for instance, the first common electrodes 151 may be electrically connected with the common electrode lines via through holes (not shown in the figure) running through the insulating layer 13 and the passivation layer 14.

In addition, for instance, the first electrode layer and the second electrode layer may also be made from other transparent conductive materials, e.g., transparent metal oxide materials such as indium gallium zinc oxide (IGZO) and indium zinc oxide (IZO). The embodiment of the present disclosure includes but not limited thereto.

For instance, the gate metal layer and the source/drain metal layer may be made from metals such as aluminum, molybdenum, titanium and copper or alloy thereof, and may be a single-layer or multilayer structure. The embodiment of the present disclosure includes but not limited thereto.

For instance, the active layers may be made from semiconductor materials such as amorphous silicon (a-Si), polysilicon (poly-Si) and metal oxides. The embodiment of the present disclosure includes but not limited thereto.

For instance, the insulating layer 13 and the passivation layer 14 may be made from one or more insulating materials including silicon oxide, silicon nitride, silicon oxynitride, aluminum oxide, hafnium oxide and resin, etc. The embodiment of the present disclosure includes but not limited thereto.

For instance, the array substrate provided by the embodiment may be applied to an LCD device in which liquid crystals have a horizontal initial alignment (namely the initial direction of the liquid crystals is substantially parallel to the plate surface of the array substrate), so that the transmittance of the display device can be improved. Of course, the embodiment of the present disclosure includes but not limited thereto.

Second Embodiment

The difference between this embodiment and the first embodiment includes that: the first electrode layer further includes additional strip common electrodes disposed between the first pixel electrodes and the second pixel electrodes. Detailed description will be given below with reference to the accompanying drawings.

Figure 5:
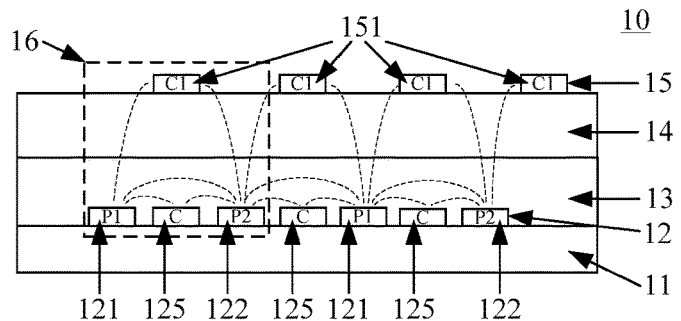
FIG. 5 is a schematic sectional view of an array substrate provided by an embodiment of the present disclosure.

For instance, as shown in FIG. 5, in the array substrate 10 provided by the embodiment, first pixel electrodes 121 and second pixel electrodes 122 are disposed between first common electrodes 151 and a base substrate 11; a first electrode layer 12 further includes additional strip common electrodes 125 disposed between the first pixel electrodes 121 and the second pixel electrodes 122 in the direction from the first pixel electrodes 121 to the second pixel electrodes 122.

In an operation process of the array substrate, an additional common voltage C different from P1 and P2 is applied to the additional strip common electrodes 125, so that voltage difference can be formed between the additional common electrodes 125 and each of the first pixel electrodes 121 and the second pixel electrodes 122. Therefore, IPS electric fields (as shown by dotted lines in FIG. 5) can be formed between the additional common electrodes 125 and the first pixel electrodes 121/the second pixel electrodes 122, so that the transmittance can be further improved.

For instance, an absolute value of the voltage difference between the first pixel electrode 121 and the additional common electrode 125 (the difference between P1 and C) may be equal to an absolute value of the voltage difference between the second pixel electrode 122 and the additional common electrode 125 (the difference between P2 and C), which is beneficial for the uniform distribution of the electric field intensity.

For instance, the additional common electrodes 125 may be partially overlapped with the first common electrodes 151 in the direction perpendicular to a plate surface of the base substrate 11, so as to prevent the first common electrodes 151 from shielding the IPS electric fields formed between the first/second pixel electrodes 121/122 and the additional common electrodes 125.

For instance, in the array substrate 10 provided by at least one example of the embodiment, the additional common electrodes 125 may be electrically connected with the first common electrodes 151, so that a same common voltage can be applied to the additional common electrodes 125 and the first common electrodes 151, and hence signal control can be simplified.

For instance, the additional common electrodes 125 may be electrically connected with the first common electrodes 151 via through holes (not shown in FIG. 5) running through an insulating layer 13 and a passivation layer 14, so that a wiring structure can be simplified.

No further description will be given to components in the second embodiment which are the same with the first embodiment.

Third Embodiment

The difference between this embodiment and the first embodiment includes that: the second electrode layer further includes additional strip pixel electrodes, and IPS electric fields may be formed between the additional pixel electrodes and the first common electrodes in the second electrode layer.

Figure 6A:
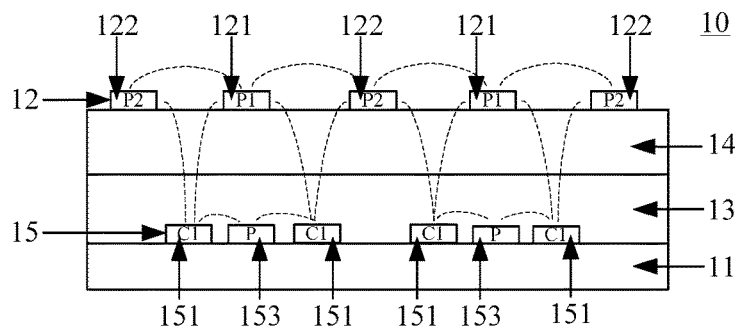
FIG. 6A is a schematic sectional view of an array substrate provided by an embodiment of the present disclosure.
Figure 6B:
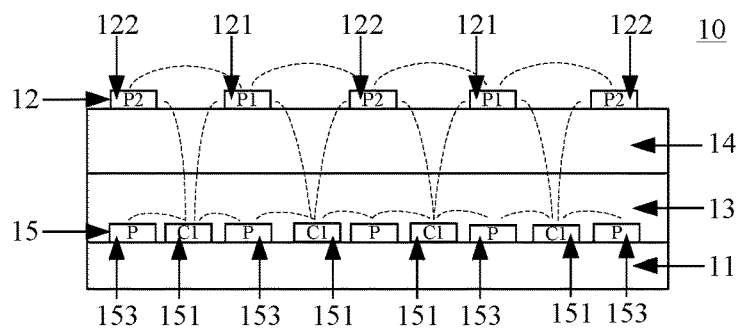
FIG. 6B is a schematic sectional view of an array substrate provided by an embodiment of the present disclosure.

For instance, as shown in FIGS. 6A and 6B, in the array substrate 10 provided by at least one example of the embodiment, first common electrodes 151 are disposed between a base substrate 11 and first pixel electrodes 121 and second pixel electrodes 122; and the second electrode layer 15 further includes additional strip pixel electrodes 153 insulated from the first common electrodes 151.

In an operation process of the array substrate provided by the embodiment, a pixel voltage P different from C1 is applied to the additional pixel electrodes 153, so that IPS electric fields can be formed between the additional pixel electrodes 153 and the first common electrodes 151, and hence the transmittance can be further improved.

For instance, in the array substrate 10 provided by at least one example of the embodiment, the additional pixel electrode 153 may correspond to at least one of the first pixel electrode 121 or the second pixel electrode 122. That is to say, the additional pixel electrode 153 may be overlapped with at least one of the first pixel electrode 121 or the second pixel electrode 122 in the direction perpendicular to the plate surface of the base substrate 11. Thus, a case that the IPS electric fields formed between the additional pixel electrodes 153 and the first common electrodes 151 are shielded by the first pixel electrodes 121 and the second pixel electrodes 122 can be avoided as much as possible.

For instance, as shown in FIG. 6A, the additional pixel electrode 153 corresponds to the first pixel electrode 121 in the direction perpendicular to the plate surface of the base substrate 11. Thus, a case that the IPS electric fields formed between the additional pixel electrodes 153 and the first common electrodes 151 disposed on two sides of the additional pixel electrode are shielded by the first pixel electrode 121 can be avoided as much as possible, so that the transmittance can be further improved.

For instance, as shown in FIG. 6B, a plurality of additional pixel electrodes 153 respectively correspond to the first pixel electrodes 121 and the second pixel electrodes 122 in the direction perpendicular to the plate surface of the base substrate 11. Thus, the case that the IPS electric fields formed between the first common electrodes 151 and the additional pixel electrodes 153 disposed on two sides of the first common electrodes are shielded by the first pixel electrodes 121 and the second pixel electrodes 122 can be avoided as much as possible, so that the transmittance can be further improved.

For instance, in the array substrate 10 provided by at least one example of the embodiment, a voltage applied to the additional pixel electrodes 153 may be the same as the voltage applied to the first pixel electrodes 121 or the second pixel electrodes 122. For instance, the additional pixel electrodes 153 and the first pixel electrodes 121 or the second pixel electrodes 122 may be electrically connected with a same component (for example, a switching element (e.g., a TFT)), so that a same pixel voltage can be applied through the component. Therefore, the structure of the array substrate can be simplified, for instance, the number of the switching elements (e.g., the TFTs) can be reduced, and hence the aperture opening ratio can be improved and the power consumption can be reduced.

No further description will be given here to components in the third embodiment which are the same with the first embodiment.

Detailed description has been given to the first electrode group in the array substrate with reference to the first embodiment, the second embodiment and the third embodiment.

On the basis of any foregoing embodiment, in the array substrate provided by at least an embodiment of the present disclosure, second electrode groups may also be formed by the first electrode layer and the second electrode layer. Each second electrode group includes a third strip pixel electrode, a fourth strip pixel electrode and a second strip common electrode. The third pixel electrodes and the fourth pixel electrodes are insulated from each other, disposed in the second electrode layer, and applied with different voltages in an operation process of the array substrate; and the second common electrodes are disposed in the first electrode layer and include members disposed between the third pixel electrodes and the fourth pixel electrodes in the direction from the third pixel electrodes to the fourth pixel electrodes.

Detailed description will be given below to positional relationships of the first electrode group and the second electrode group in the array substrate with reference to the fourth embodiment and the fifth embodiment.

Fourth Embodiment

Figure 7:
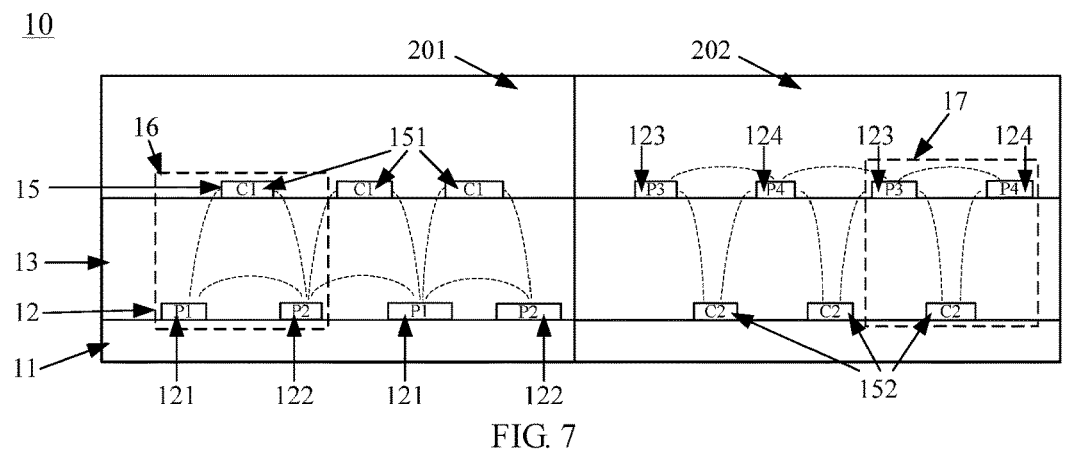
FIG. 7 is a schematic sectional view of an array substrate provided by an embodiment of the present disclosure.

The difference between this embodiment and the first embodiment includes that: as shown in FIG. 7, the array substrate 10 comprises a first pixel unit 201 and a second pixel unit 202 which are adjacent to each other; first electrode groups 16 are disposed in the first pixel unit 201; and second electrode groups 17 are disposed in the second pixel unit 202.

For instance, as shown in FIG. 7, each first electrode group 16 includes a first strip pixel electrode 121, a second strip pixel electrode 122 and a first strip common electrode 151; and each second electrode group 17 includes a third strip pixel electrode 123, a fourth strip pixel electrode 124 and a second strip common electrode 152. The third pixel electrodes 123 and the fourth pixel electrodes 124 are insulated from each other, disposed in the second electrode layer 15, and applied with different voltages in the operation process of the array substrate. The second common electrodes 152 are disposed in the first electrode layer 12 and include members disposed between the third pixel electrodes 123 and the fourth pixel electrodes 124 in the direction from the third pixel electrodes 123 to the fourth pixel electrodes 124.

The structure of each pixel unit may be understood with reference to relevant description in the first embodiment. No further description will be given here.

In the operation process of the array substrate, a third pixel voltage P3 is applied to the third pixel electrodes 123; a fourth pixel voltage P4 is applied to the fourth pixel electrodes 124; directions and/or magnitude values of the fourth pixel voltage P4 and the third pixel voltage P3 are different, so that voltage difference can be formed between the third pixel electrodes 123 and the fourth pixel electrodes 124, and hence IPS electric fields can be formed. A second common voltage C2 different from P3 and P4 is applied to the second common electrodes 152, so that voltage difference can be formed between the second common electrodes 152 and the third pixel electrodes 123 and the fourth pixel electrodes 124, and hence FFS electric fields can be formed.

In the array substrate as shown in FIGS. 1A and 1B, driving modes such as a dot inversion (the voltages of adjacent pixel units have opposite polarities) may be adopted. That is to say, in a period of the same frame, different signals are respectively applied to two adjacent pixel units (for instance, a positive signal is applied to one pixel unit and a negative signal is applied to the other pixel unit). Thus, FFS electric fields formed in the two pixel units can have opposite directions, namely a direction of an FFS electric field formed in one pixel unit is from the common electrode to the pixel electrode, and a direction of another FFS electric field formed in the other pixel unit is from the pixel electrode to the common electrode.

In the array substrate provided by the embodiment, only the first electrode groups are formed in the first pixel unit and only the second electrode groups are formed in the second pixel unit, and different electrode groups are respectively formed in two adjacent pixel units (namely the first pixel unit and the second pixel unit). Thus, the FFS electric fields in the first pixel unit and the second pixel unit can have opposite directions by inputting the same signal into the adjacent pixel units in the period of the same frame. Therefore, compared with the array substrate as shown in FIGS. 1A and 1B, the driving mode of the array substrate provided by the embodiment can reduce power consumption by inputting a single signal in the period of the same frame, rather than inputting positive and negative alternating signals.

Of course, the array substrate provided by the embodiment of the present disclosure may also adopt a driving mode of a row inversion or a column inversion. In this case, the power consumption may also be reduced by only inputting a single signal in the period of the same frame.

For instance, in the array substrate 10 provided by at least one example of the embodiment, orthographic projections of the second common electrodes 152 on the second electrode layer 15 may not be overlapped with the third pixel electrodes 123 and the fourth pixel electrodes 124. Therefore, a storage capacitance cannot be formed between the second common electrodes 152 and the third/fourth pixel electrodes 123/124, so that the power consumption can be further reduced.

For instance, an absolute value of the voltage difference between the first pixel electrodes 121/the second pixel electrodes 122 and the first common electrodes 151 may be equal to an absolute value of the voltage difference between the third pixel electrodes 123/the fourth pixel electrodes 124 and the second common electrodes 152. Therefore, uniform distribution of the electric fields can be achieved, and hence the display effect can be improved.

For instance, the voltages applied to the third pixel electrodes 123 and the second pixel electrodes 122 may be same, and/or the voltages applied to the fourth pixel electrodes 124 and the first pixel electrodes 121 may be same. Thus, the signal control can be simplified.

For instance, in the array substrate 10 provided by at least one example of the embodiment, a same voltage may be applied to the first common electrodes 151 and the second common electrodes 152. Thus, the signal control can be simplified and the wiring structure of the array substrate can be simplified as well. Of course, a common voltage applied to the first common electrodes 151 may be different from a common voltage applied to the second common electrodes 152.

Description is given in FIG. 7 by only taking the case that the first common electrodes 151 in the first electrode groups 16 are disposed on an upper layer (namely one side of the insulating layer 13 away from the base substrate 11) and the second common electrodes 152 in the second electrode groups 17 are disposed on a lower layer (namely another side of the insulating layer 13 close to the base substrate 11) as an example. Of course, it may be possible that the first common electrodes 151 in the first electrode groups 16 are disposed on the lower layer while the second common electrodes 152 in the second electrode groups 17 are disposed on the upper layer.

No further description will be given here to components in the fourth embodiment which are the same with the first embodiment.

Fifth Embodiment

Figure 8:
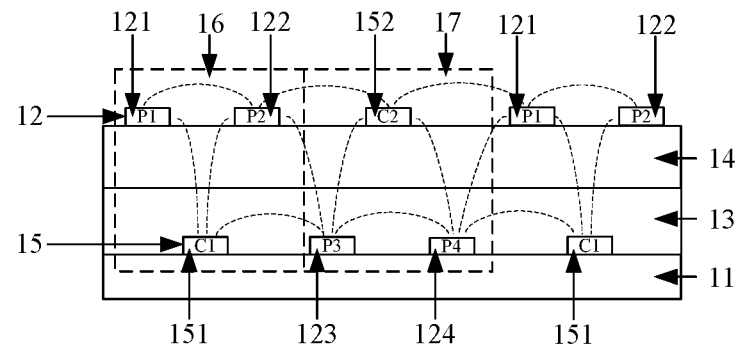
FIG. 8 is a schematic sectional view of an array substrate provided by an embodiment of the present disclosure.

The difference between this embodiment and the first embodiment includes that: as shown in FIG. 8, a same pixel unit not only includes a first electrode group 16 but also includes a second electrode group 17, and the second electrode group 17 is adjacent to the first electrode group 16.

For instance, as shown in FIG. 8 in the array substrate 10 provided by the embodiment, the first electrode layer 12 and the second electrode layer 15 also form the second electrode group 17 on the basis of forming the first electrode group 16. Each second electrode group 17 includes a third strip pixel electrode 123, a fourth strip pixel electrode 124 and a second strip common electrode 152. The third pixel electrodes 123 and the fourth pixel electrodes 124 are insulated from each other, disposed in the second electrode layer 15, and applied with different voltages in the operation process. The second common electrodes 152 are disposed in the first electrode layer 12 and include members disposed between the third pixel electrodes 123 and the fourth pixel electrodes 124 in the directions from the third pixel electrodes 123 to the fourth pixel electrodes 124.

In the operation process of the array substrate, a third pixel voltage P3 is applied to the third pixel electrodes 123; a fourth pixel voltage P4 is applied to the fourth pixel electrodes 124; the directions and/or magnitude values of the fourth pixel voltage P4 and the third pixel voltage P3 are different, so that voltage difference can be formed between the third pixel electrodes 123 and the fourth pixel electrodes 124. Hence, IPS electric fields can be formed. A second common voltage C2 different from P3 and P4 is applied to the second common electrodes 152, so that voltage difference can be formed between the second common electrodes 152 and the third pixel electrodes 123 and also between the second common electrodes 152 and the fourth pixel electrodes 124. Hence, FFS electric fields can be formed.

In addition, as the first electrode group 16 is adjacent to the second electrode group 17, IPS electric fields may be formed when there is voltage difference between the first/second pixel electrodes 121/122 in the first electrode group 16 and the second common electrodes 152 in the second electrode group 17. IPS electric fields may be formed when there is voltage difference between the first common electrodes 151 in the first electrode group 16 and the third/fourth pixel electrodes 123/124 in the second electrode group 17. Thus, compared with the case as shown in the first embodiment, stronger IPS electric fields can be formed, so that the transmittance can be further improved.

For instance, as shown in FIG. 8, in the array substrate 10 provided by the embodiment, orthographic projections of the second common electrodes 152 on the second electrode layer 15 are not overlapped with the third pixel electrodes 123 and the fourth pixel electrodes 124. Thus, storage capacitance may not be formed between the second common electrodes 152 and the third pixel electrodes/the fourth pixel electrodes 123/124, so that the power consumption can be further reduced.

Of course, the orthographic projections of the second common electrodes 152 on the second electrode layer 15 may also be at least partially overlapped with the third pixel electrodes 123 and/or the fourth pixel electrodes 124.

For instance, as shown in FIGS. 9A, 9B, 10A and 10B, in the array substrate 10 provided by at least one example of the embodiment, a same voltage may be applied to the fourth pixel electrodes 124 and the first pixel electrodes 121 in the operation process; and/or a same voltage may be applied to the third pixel electrodes 123 and the second pixel electrodes 122 in the operation process. Thus, pixel electrodes applied with the same voltage may be electrically connected to a same component (e.g., a TFT), so that the same voltage can be applied through the component. Therefore, the structure of the array substrate can be simplified; the aperture opening ratio can be improved; and the power consumption can be reduced.

Figure 9A:
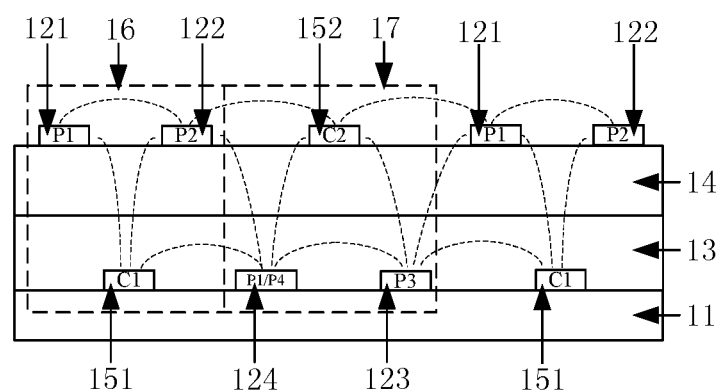
FIG. 9A is a schematic sectional view of an array substrate provided by an embodiment of the present disclosure.
Figure 9B:
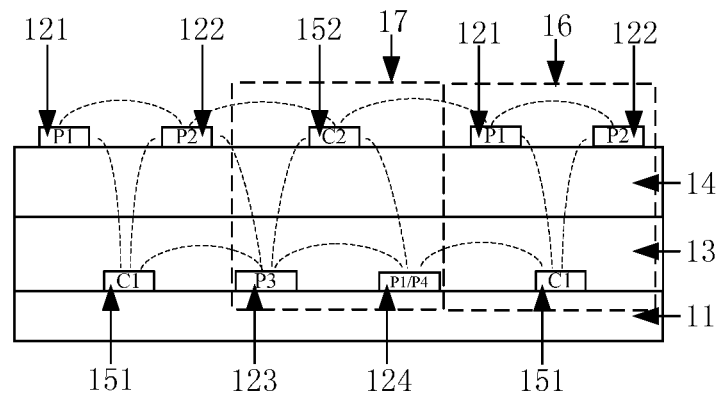
FIG. 9B is a schematic sectional view of an array substrate provided by an embodiment of the present disclosure.

For instance, as shown in FIGS. 9A and 9B, a same voltage is applied to the fourth pixel electrodes 124 and the first pixel electrodes 121 (namely the fourth pixel voltage P4 is identical to the first pixel voltage P1).

Figure 10A:
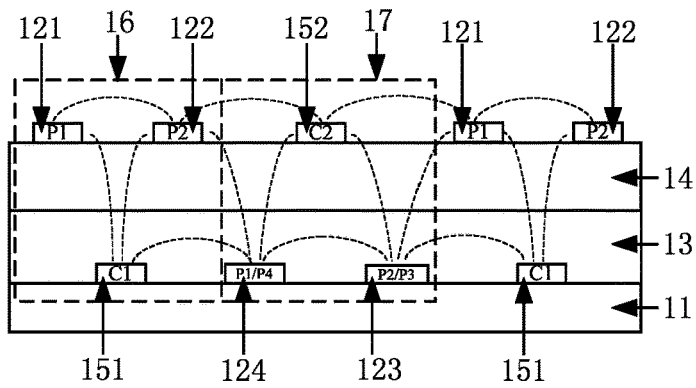
FIG. 10A is a schematic sectional view of an array substrate provided by an embodiment of the present disclosure.
Figure 10B:
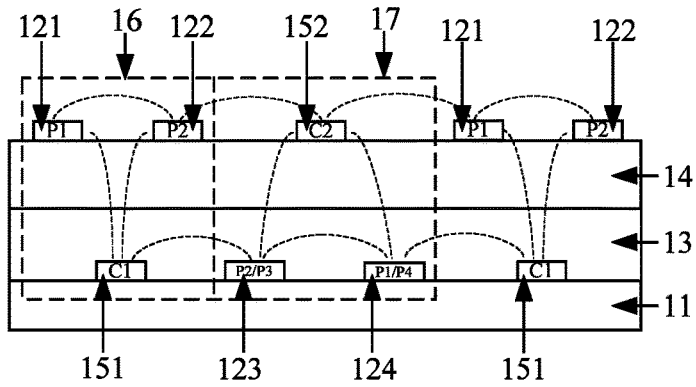
FIG. 10B is a schematic sectional view of an array substrate provided by an embodiment of the present disclosure.

For instance, as shown in FIGS. 10A and 10B, a same voltage may be applied to the fourth pixel electrodes 124 and the first pixel electrodes 121 (namely the fourth pixel voltage P4 is identical to the first pixel voltage P1), and a same voltage may be applied to the third pixel electrodes 123 and the second pixel electrodes 122 (namely the third pixel voltage P3 is identical to the second pixel voltage P2).

For instance, as shown in FIG. 9B, in the array substrate 10 provided by at least one example of the embodiment, when a same voltage is applied to the fourth pixel electrodes 124 and the first pixel electrodes 121, in the first electrode group 16 and the second electrode group 17 which are adjacent to each other, the fourth pixel electrode 124 is disposed on one side of the second common electrode 152 that is close to the first electrode group 16, and the first pixel electrode 121 is disposed on one side of the first common electrode 151 that is close to the second electrode group 17. Compared with the case as shown in FIG. 9A, this arrangement leads to no voltage difference between the first pixel electrodes 121 and the fourth pixel electrodes 124, so that the signal control can be simplified. Of course, compared with the case as shown in FIG. 9A, a part of FFS electric fields may be lost.

For instance, as shown in FIG. 10B, when a same voltage is applied to the third pixel electrodes 123 and the second pixel electrodes 122, in the first electrode group 16 and the second electrode group 17 which are adjacent to each other, the third pixel electrode 123 is disposed on one side of the second common electrode 152 that is close to the first electrode group 16, and the second pixel electrode 122 is disposed on one side of the first common electrode 151 that is close to the second electrode group 17. Compared with the case as shown in FIG. 10A, this arrangement may lead to no voltage difference between the third pixel electrodes 123 and the second pixel electrodes 122, so that the signal control can be simplified. Of course, compared with the case as shown in FIG. 10A, a part of FFS electric fields may be lost.

For instance, in the array substrate 10 provided by the embodiment, a same voltage may be applied to the first common electrodes 151 and the second common electrodes 152. For instance, the first common electrodes 151 and the second common electrodes 152 may be electrically connected with each other, for instance, electrically connected to a same common electrode line. Due to the arrangement, the wiring structure can be simplified, so that the signal control can be simplified.

Sixth Embodiment

Figure 11:
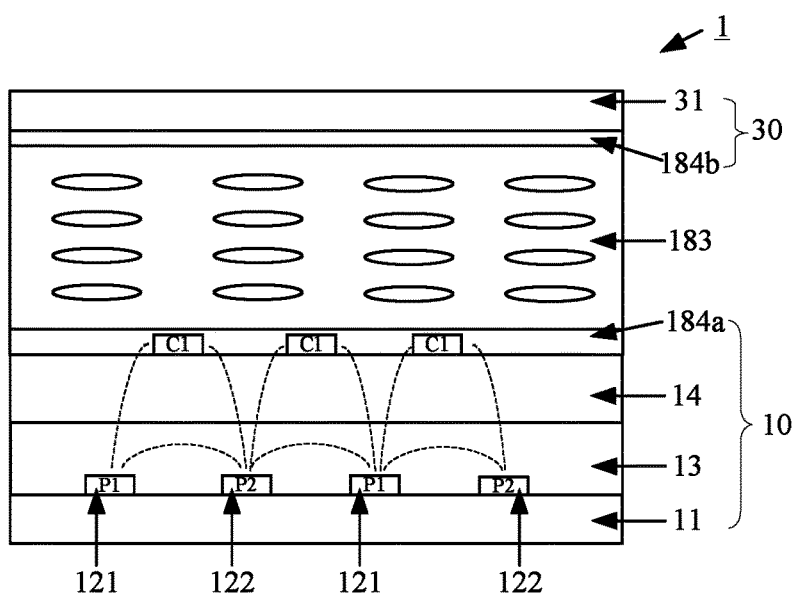
FIG. 11 is a schematic sectional view of a display device provided by an embodiment of the present disclosure.

As illustrated in FIG. 11, the embodiment provides a display device 1, which comprises the array substrate 10 provided by any foregoing embodiment of the present disclosure.

For instance, the display device 1 may be an LCD device, which comprises an opposing substrate (e.g., a color filter (CF) substrate) 30 and an array substrate 10 which are arranged opposite to each other, and a liquid crystal layer 183 disposed between the opposing substrate 30 and the array substrate 10.

For instance, a first alignment film 184a located close to the liquid crystal layer 183 is disposed on the array substrate 10 in the display device 1, and a second alignment film 184b located close to the liquid crystal layer 183 is disposed on the opposing substrate 30. Under the combined action of the first alignment film 184a and the second alignment film 184b, an initial alignment of liquid crystals in the liquid crystal layer 183 is a horizontal direction (namely a direction substantially parallel to a plate surface of the array substrate 10). Thus, high transmittance can be obtained.

For instance, the display device 1 may be any product or component with a display function such as a mobile phone, a tablet PC, a TV, a display, a notebook computer, a digital picture frame and a navigator, etc.

In the array substrate and the display device provided by embodiments of the present disclosure, as two types of pixel electrodes applied with different voltages are designed, it is ensured that not only FFS eclectic fields are formed between the two types of pixel electrodes and the common electrodes but also IPS electric fields caused by voltage difference between the two types of pixel electrodes can be formed. Thus, the transmittance of the display device can be improved. In addition, as a planar shape of the common electrodes and the two types of pixel electrodes is a strip shape, storage capacitance between the two types of pixel electrodes and the common electrodes can be reduced, so that the power consumption can be reduced.

The following should be noted:

(1) The accompanying drawings of the embodiments of the present disclosure only involve the structures described in the embodiments of the present disclosure, and other structures may be understood with reference to conventional designs;

(2) The thickness and the shape of various films in the accompanying drawings do not reflect true scales and are only intended to illustrate the content of the embodiments of the present disclosure;

(3) The embodiments of the present disclosure and the characteristics in the embodiments may be mutually combined when no conflict exists.

What are described above is related to the illustrative embodiments of the disclosure only and not limitative to the scope of the disclosure. Therefore, the scopes of the disclosure are defined by the accompanying claims.

The present application claims the priority of the Chinese Patent Application No. 201610005327.7 filed on Jan. 4, 2016, which is incorporated herein by reference in its entirety as part of the disclosure of the present application.

What is claimed is:

1. An array substrate, comprising a base substrate, an insulating layer disposed on the base substrate, and a first electrode layer and a second electrode layer disposed on the base substrate and respectively arranged on two sides of the insulating layer, wherein a first electrode group is formed by the first electrode layer and the second electrode layer, and the first electrode group includes:

a first strip pixel electrode and a second strip pixel electrode, wherein the first pixel electrode and the second pixel electrode are insulated from each other, disposed in the first electrode layer, and applied with different voltages in an operation process; and a first strip common electrode being disposed in the second electrode layer and including a member disposed between the first pixel electrode and the second pixel electrode in a direction from the first pixel electrode to the second pixel electrode;

wherein the first pixel electrode and the second pixel electrode are disposed between the first common electrode and the base substrate; and the first electrode layer further includes an additional strip common electrode disposed between the first pixel electrode and the second pixel electrode in a direction from the first pixel electrode to the second pixel electrode; alternatively, the first common electrode is disposed between the base substrate and the first pixel electrode and the second pixel electrode; and the second electrode layer further includes a strip-shaped additional pixel electrode insulated from the first common electrode.

2. The array substrate according to claim 1, wherein the first common electrode is not overlapped with both the first pixel electrode and the second pixel electrode in a direction perpendicular to a plate surface of the base substrate.

3. An array substrate, comprising a base substrate, an insulating layer disposed on the base substrate, and a first electrode layer and a second electrode layer disposed on the base substrate and respectively arranged on two sides of the insulating layer, wherein a first electrode group is formed by the first electrode layer and the second electrode layer, and the first electrode group includes:

a first strip pixel electrode and a second strip pixel electrode, wherein the first pixel electrode and the second pixel electrode are insulated from each other, disposed in the first electrode layer, and applied with different voltages in an operation process; and a first strip common electrode being disposed in the second electrode layer and including a member disposed between the first pixel electrode and the second pixel electrode in a direction from the first pixel electrode to the second pixel electrode;

the array substrate further comprising a plurality of pixel units, each pixel unit including a central region and a peripheral region disposed at periphery of the central region, wherein:

the peripheral region is provided with a plate common electrode and a plate pixel electrode which are respectively disposed on two sides of the insulating layer, and the plate common electrode and the plate pixel electrode are overlapped in a direction perpendicular to a plate surface of the base substrate; or the peripheral region is provided with a first plate common electrode and a first plate pixel electrode which are respectively disposed on two sides of the insulating layer and overlapped in the direction perpendicular to the plate surface of the base substrate, and the peripheral region is also provided with a second plate common electrode and a second plate pixel electrode which are respectively disposed on two sides of the insulating layer and overlapped in the direction perpendicular to the plate surface of the base substrate, and the first common electrode is disposed between the first plate common electrode and the second plate common electrode in a direction from the first plate common electrode to the second plate common electrode.

4. The array substrate according to claim 3, wherein each pixel unit further includes gate lines which are respectively disposed on two opposite sides of each pixel unit; and
- in a direction perpendicular to an extension direction of the gate lines, a ratio of a size of the plate common electrode to a distance between the gate lines and a ratio of a size of the plate pixel electrode to the distance between the gate lines are both 10%-15%; or
- in the direction perpendicular to the extension direction of the gate lines, a ratio of a sum of a size of the first plate common electrode and a size of the second plate common electrode to the distance between the gate lines and a ration of a sum of a size of the first plate pixel electrode and a size of the second plate pixel electrode to the distance between the gate lines are both 10%-15%.

5. The array substrate according to claim 3, wherein:
- a percentage of an area of the plate common electrode to an area of the pixel unit and a percentage of an area of the plate pixel electrode to the area of the pixel unit are both 10%-15%; or
- a percentage of a sum of an area of the first plate common electrode and an area of the second plate common electrode to the area of the pixel unit and a percentage of a sum of an area of the first plate pixel electrode and an area of the second plate pixel electrode to the area of the pixel unit are both 10%-15%.

6. The array substrate according to claim 1, wherein the additional common electrode is electrically connected with the first common electrode.

7. The array substrate according to claim 1, wherein:
the additional pixel electrode corresponds to at least one of the first pixel electrode or the second pixel electrode.

8. The array substrate according to claim 1, wherein a same voltage is applied to the additional pixel electrode and the first pixel electrode in the operation process, or a same voltage is applied to the additional pixel electrode and the second pixel electrode in the operation process.

9. The array substrate according to claim 1, wherein in a direction from the first pixel electrode to the second pixel electrode, a ratio of a distance between the first pixel electrode and the second pixel electrode to a width of the first pixel electrode and a ratio of the distance between the first pixel electrode and the second pixel electrode to a width of the second pixel electrode are both 1.6-5; and/or
a plurality of first electrode groups are formed by the first electrode layer and the second electrode layer, and a ratio of a distance between corresponding first common electrodes of two adjacent first electrode groups to a width of one first common electrode is 1.6-5 in the direction from the first pixel electrode to the second pixel electrode.

10. The array substrate according to claim 9, wherein the width of the first pixel electrodes, the width of the second pixel electrodes and the width of the first common electrode are all between 2 µm and 10 µm.

11. An array substrate, comprising a base substrate, an insulating layer disposed on the base substrate, and a first electrode layer and a second electrode layer disposed on the base substrate and respectively arranged on two sides of the insulating layer, wherein a first electrode group is formed by the first electrode layer and the second electrode layer, and the first electrode group includes:
- a first strip pixel electrode and a second strip pixel electrode, wherein the first pixel electrode and the second pixel electrode are insulated from each other, disposed in the first electrode layer, and applied with different voltages in an operation process; and
- a first strip common electrode being disposed in the second electrode layer and including a member disposed between the first pixel electrode and the second pixel electrode in a direction from the first pixel electrode to the second pixel electrode;
wherein a second electrode group is also formed by the first electrode layer and the second electrode layer and the second electrode group includes:
- a strip third pixel electrode and a strip fourth pixel electrode, wherein the third pixel electrode and the fourth pixel electrode are insulated from each other, disposed in the second electrode layer, and applied with different voltages in the operation process; and
- a strip second common electrode being disposed in the first electrode layer and including a member disposed between the third pixel electrode and the fourth pixel electrode in a direction from the third pixel electrode to the fourth pixel electrode.

12. The array substrate according to claim 11, wherein an orthographic projection of the second common electrode on the second electrode layer is not overlapped with the third pixel electrode and the fourth pixel electrode.

13. The array substrate according to claim 11, further comprising a first pixel unit and a second pixel unit which are adjacent to each other, wherein:
the first pixel unit is provided with the first electrode group, and the second pixel unit is provided with the second electrode group.

14. The array substrate according to claim 11, wherein the second electrode group is adjacent to the first electrode group.

15. The array substrate according to claim 14, wherein:
- a same first voltage is applied to the fourth pixel electrode and the first pixel electrode; and/or
- a same second voltage is applied to the third pixel electrode and the second pixel electrode.

16. The array substrate according to claim 15, wherein:
when the same first voltage is applied to the fourth pixel electrode and the first pixel electrode, in the first electrode group and the second electrode group which are adjacent to each other, the fourth pixel electrode is disposed on one side of the second common electrode that is close to the first electrode group, and the first pixel electrode is disposed on one side of the first common electrode that is close to the second electrode group; and
when the same second voltage is applied to the third pixel electrode and the second pixel electrode, in the first electrode group and the second electrode group which are adjacent to each other, the third pixel electrode is disposed on one side of the second common electrode that is close to the first electrode group, and the second pixel electrode is disposed on one side of the first common electrode that is close to the second electrode group.

17. The array substrate according to claim 11, wherein a same voltage is applied to the first common electrode and the second common electrode in the operation process.

18. A display device, comprising the array substrate according to claim 1.

* * * * *